US011750366B2

United States Patent
Zhang et al.

(10) Patent No.: US 11,750,366 B2
(45) Date of Patent: Sep. 5, 2023

(54) REDUCED COMPLEXITY MODULAR POLYNOMIAL MULTIPLICATION FOR R-LWE CRYPTOSYSTEMS

(71) Applicants: Regents of the University of Minnesota, Minneapolis, MN (US); Ohio State Innovation Foundation, Columbus, OH (US)

(72) Inventors: Xinmiao Zhang, Columbus, OH (US); Keshab K. Parhi, Minneapolis, MN (US)

(73) Assignees: Regents of the University of Minnesota, Minneapolis, MN (US); Ohio State Innovation Foundation, Columbus, OH (US)

( * ) Notice: Subject to any disclaimer, the term of this patent is extended or adjusted under 35 U.S.C. 154(b) by 36 days.

(21) Appl. No.: 17/531,208

(22) Filed: Nov. 19, 2021

(65) Prior Publication Data
US 2023/0163944 A1    May 25, 2023

(51) Int. Cl.
*H04L 9/00* (2022.01)
*H04L 9/30* (2006.01)

(52) U.S. Cl.
CPC ............ *H04L 9/008* (2013.01); *H04L 9/3026* (2013.01); *H04L 9/3093* (2013.01)

(58) Field of Classification Search
CPC ...... H04L 9/008; H04L 9/3026; H04L 9/3093
See application file for complete search history.

(56) References Cited

U.S. PATENT DOCUMENTS

| | | | |
|---|---|---|---|
| 2018/0375639 A1* | 12/2018 | Lauter | H04L 9/008 |
| 2020/0082738 A1* | 3/2020 | Poeppelmann | H04L 9/002 |
| 2022/0085970 A1* | 3/2022 | Al Badawi | G06F 7/724 |

OTHER PUBLICATIONS

High-Speed RLWE-Oriented Polynomial Multiplier Utilizing Karatsuba Algorithm by Wong et al., published Jun. 2021 (Year: 2021).*

(Continued)

*Primary Examiner* — Vu V Tran
(74) *Attorney, Agent, or Firm* — Theodore M. Magee; Westman, Champlin & Koehler, P.A.

(57) ABSTRACT

A method includes receiving a first polynomial and a second polynomial, both of order n−1 and forming d polynomial segments from both the first polynomial and the second polynomial such that each polynomial segment is of order (n/d)−1. The polynomial segments of the first polynomial and the d polynomial segments of the second polynomial are used to form segment products. Each segment product is divided into a first polynomial substructure of order n/d and a second polynomial substructure of order (n/d)−1. A first polynomial substructure containing the first n/d coefficients of a product of the first polynomial and the second polynomial is summed with a second polynomial substructure to form a sum substructure. The sum substructure is used multiple times to determine coefficients of a polynomial representing the modulo $x^n+1$ of the product of the first polynomial and the second polynomial.

20 Claims, 6 Drawing Sheets

(56) References Cited

OTHER PUBLICATIONS

A Karatsuba-Based Algorithm for Polynomial Multiplication in Chebyshev Form, by Lima et al., published Jun. 2010 (Year: 2010).*
Implementation of Karatsuba Algorithm Using Polynomial Multiplication, by Mishra, published Mar. 2012 (Year: 2012).*
Five, Six, and Seven-Term Karatsuba-Like Formulae, by Montgomery, published 2005 (Year: 2005).*
Brakerski, Fully Homomorphic Encryption without Modulus Switching from Classical GapSVP, Proc. CRYPTO, pp. 868-886, 2012.
Brakerski et al., Fully Homomorphic Encryption without Bootstrapping, Proc. Innovations in Theoretical Computer Science Conference, pp. 309-325, 2012.
Ding et al., A Low-Latency and Low-Cost Montgomery Modular Multiplier Based on NLP Multiplication, IEEE Transactions on Circuits and Systems—II: Express Briefs, vol. 67, No. 7, pp. 1319-1323, 2020.
Doroz et al., Accelerating Fully Homomorphic Encryption in Hardware, IEEE Transactions on Computers, vol. 64, No. 6, pp. 1509-1521, 2015.
Freking et al., Parallel Modular Multiplication with Application to VLSI RSA Implementation, Proc. IEEE Intl. Symp. on Circuits and Syst., pp. 490-495, 1999.
Karatsuba et al., Multiplication of Many-Digital Nos. by Automatic Computers, Doklady Akademii Nauk, vol. 145, No. 2, pp. 293-294, Russian Academy of Science, 1962.
Mert et al., design and Implementation of a Fast and Scalable NTT-Based Polynomial Multiplier Architecture, Proc. Euromicro Conf. on Digital Syst Design, 25 pages, 2019.
Parhi, VLSI Digital Signal Processing Systems, Chapter 2, 25 pages, 1999.
Parhi, Algorithmic Strength Reduction in Filters and Transforms, Chapter 9, pp. 255-311, 1999.
Poppelmann et al., Towards Efficient Arithmetic for Lattice-Based Cryptography on Reconfigurable Hardware, Proc. Intl. Conf. on Cryptology and Info. Security in Latin America, pp. 139-158, 2012.
Riazi et al., HEAX: An Architecture of Computing on Encrypted Data, Proc. Intl. Conf. on Architectural Support for Programming Languages and Operating Systems, pp. 1295-1309, 2020.
Roy et al., Hardware Assisted Fully Homomorphic Function Evaluation and Encrypted Search, IEEE Transactions on Computers, vol. 66, No. 9, pp. 1562-1572, 2017.
Roy et al., FPGA-based High-Performance Parallel Architecture for Homomorphic Computing on Encrypted Data, IEEE International Symposium on High Performance Computer Architecture, pp. 387-398, 2019.
Tan et al., An Efficient Polynomial Multiplier Architecture for the Bootstrapping Algorithm in a Fully Homomorphic Encryption Scheme, IEEE International Workshop on Signal Processing System, pp. 85-90, 2019.
Zhang et al., An Efficient and Parallel R-LWE Cryptoprocessor, IEEE Transactions on Circuits and Systems—II: Express Briefs, vol. 67, No. 5, pp. 886-890, 2020.

\* cited by examiner

REDUCED COMPLEXITY MODULAR POLYNOMIAL MULTIPLICATION FOR R-LWE CRYPTOSYSTEMS

BACKGROUND

The ring-learning with errors (R-LWR) problem is utilized to build many ciphers resisting quantum-computing attacks and fully homomorphic encryption that allows computations to be carried out on encrypted data. Modular multiplication of long polynomials with large coefficients is the most critical operation in these schemes. The polynomial multiplication complexity can be reduced by the Karatsuba scheme.

The discussion above is merely provided for general background information and is not intended to be used as an aid in determining the scope of the claimed subject matter. The claimed subject matter is not limited to implementations that solve any or all disadvantages noted in the background.

SUMMARY

A device-implemented method includes receiving a first polynomial and a second polynomial, both of order n−1 and forming d polynomial segments from both the first polynomial and the second polynomial such that each polynomial segment is of order (n/d)−1. The d polynomial segments of the first polynomial and the d polynomial segments of the second polynomial are used to form segment products. Each segment product is divided into a first polynomial substructure of order n/d and a second polynomial substructure of order (n/d)−1. A first polynomial substructure containing the first n/d coefficients of a product of the first polynomial and the second polynomial is summed with a second polynomial substructure to form a sum substructure. The sum substructure is used multiple times to determine coefficients of a polynomial representing the modulo $x^n+1$ of the product of the first polynomial and the second polynomial.

In accordance with a further embodiment, a device-implemented method includes receiving a first polynomial and a second polynomial, both of order n−1 and using a Karatsuba scheme on the first polynomial and second polynomial to form segment products. Each segment product is divided into a first polynomial substructure and a second polynomial substructure. A second polynomial substructure, containing the last (n/d)−1 coefficients of a product of the first polynomial and the second polynomial, is summed with a first polynomial substructure to form a sum substructure. The sum substructure is used multiple times to determine coefficients of a polynomial representing the modulo $x^n+1$ of the product of the first polynomial and the second polynomial.

In accordance with a still further embodiment, a method includes performing a cryptographic operation based on modulo xn+1->x^n+1 of a product of two polynomials each of order n−1. The modulo xn+1->x^n+1 of the product of the two polynomials is determined using a Karatsuba scheme of forming the product of the two polynomials to form segment products. Each segment product is divided into polynomial substructures. A sum substructure is formed using a polynomial substructure containing coefficients of a polynomial representing the product of the two polynomials. The sum substructure is used multiple times to determine coefficients for a polynomial representing a modulo $x^n+1$ of the product of the two polynomials.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In the embodiments described below, a new method is proposed to integrate a modular reduction into the Karatsuba polynomial multiplication. Modular reduction is applied to intermediate segment products instead of the final product. As a result, additional substructure sharing is enabled and the number of coefficient additions needed for assembling the segment products to get the final result is substantially reduced. For polynomial multiplications with decomposition factors 2, 3, and 4, the proposed scheme reduces the number of additions by 13-17%.

1. Introduction

Lattice-based ciphers utilizing the ring-learning with errors (R-LWE) problem are among the most promising and feasible candidates to resist quantum-computing attacks. Additionally, fully homomorphic encryption (FHE) allows computations to be carried out on encrypted data. It is a key enabler for secure and private cloud or distributed computing. The most popular FHE schemes, such as the BGV and BFV, are also based on the R-LWE problem.

The computations involved in the R-LWE problem can be broken down into polynomial multiplications and additions over the ring $Z_q[x]/(x^n+1)$. The multiplication between two polynomials is followed by modulo reduction by $x^n+1$ and the calculations on the coefficients are done modulo q. Large n and q are needed to achieve sufficient security level in Lattice-based ciphers and reduce the frequency of the expensive bootstrapping in FHE. For example, to allow four levels of multiplications between each bootstrapping, q has 180 bits and n=4096.

The embodiments described herein reduce the modular polynomial multiplication complexity by integrating the modular reduction into the Karatsuba multiplication process. Instead of waiting until after the segment products are assembled to get the final polynomial product, the modular reduction is applied to individual segment products. Since the modulus is in the format of $x^n+1$, the reduction is carried out effectively as shifting the segment products. Due to the shifting, additional substructure sharing is enabled when the segment products are added up to derive the final result. Accordingly, the number of required coefficient additions is substantially reduced. For Karatsuba polynomial multiplications with decomposition factors of 2, 3, and 4, the proposed method leads to 13-17% reduction on the number of coefficient additions needed to assemble the segment products.

2. Polynomial Multiplication Over Ring and Karatsuba Formula

Over the ring $Z_q[x]/(x^n+1)$, each element is a polynomial with degree lower than n and the coefficients are non-negative integers less than q. The product of $A(x)=\alpha_0+\alpha_1 x+\ldots+\alpha_{n-1}x^{n-1}$ and $B(x)=b_0+b_1 x+\ldots+b_{n-1}x^{n-1}$ ($0\leq\alpha_i$; $b_i<q$) is $A(x)B(x) \mod (x^n+1)$ and the computations over the coefficients, $\alpha_i$; $b_i$, are carried out modulo q.

In the schoolbook multiplication of two polynomials of length n, $n^2$ multiplications on the coefficients are needed. The Karatsuba algorithm was originally proposed to reduce the complexity of large integer multiplications. The same formula can be also used to reduce the number of coefficient multiplications in polynomial multiplication at the cost of larger number of coefficient additions. Decompose $A(x)$ of degree $n-1$ into $A_0(x)+A_1(x)x^{n/2}$, where $A_0(x)=\alpha_0+\alpha_1 x+\ldots+\alpha_{n/2-1}x^{n/2-1}$ and $A_1(x)=\alpha_{n/2}+\alpha_{n/2+1}x+\ldots+\alpha_{n-1}x^{n/2-1}$. Decompose $B(x)$ in a similar way. Then, using the Karatsuba formula, $P(x)=A(x)B(x)$ can be computed as $P_0(x)+P_1(x)x^{n/2}+P_2(x)x^n$, where $$P_0=A_0B_0$$

$$P_1=(A_0+A_1)(B_0+B_1)-A_0B_0-A_1B_1$$

$$P_2=A_1B_1 \quad (1)$$

For conciseness, '(x)' is dropped from the notations if no ambiguity occurs as in the above equations. There are only three multiplications of polynomials of length n/2 in (1). Hence, the number of coefficient multiplications is reduced to $3(n/2)^2=3n^2/4$. The degree of $P(x)$ is $2(n-1)$. Rewrite $P(x)$ as $P_l(x)+x^n P_h(x)$, where $P_l(x)=p_0+p_1 x+\ldots+p_{n-1}x^{n-1}$ and $P_h(x)=p_n+p_{n+1}x+\ldots+p_{2n+2}X^{n-2}$. Then $$P(x) \mod (x^n+1) = (P_l(x) + (x^n+1-1)P_h(x)) \mod (x^n+1) \quad (2)$$

$$= P_l(x) - P_h(x).$$

The number of coefficient multiplications can be further reduced by using larger decomposition factors. If $A(x)$ and $B(x)$ are each decomposed into three segments of length n/3, the product $P(x)=P_0(x)+P_1(x)x^{n/3}+P_2(x)x^{2n/3}+P_3(x)x^n+P_4(x)x^{4n/3}$ can be calculated as $$P_0 = A_0B_0; \quad (3)$$
$$P_1 = (A_0+A_1)(B_0+B_1) - A_1B_1 - A_0B_0;$$
$$P_2 = (A_0+A_1+A_2)(B_0+B_1+B_2)$$
$$\quad -((A_0+A_1)(B_0+B_1)-A_1B_1)$$
$$\quad -((A_1+A_2)(B_1+B_2)-A_1B_1);$$
$$P_3 = (A_1+A_2)(B_1+B_2) - A_1B_1 - A_2B_2;$$
$$P_4 = A_2B_2;$$

In total, 6 multiplications between polynomials of length n/3 are needed and the total number of coefficient multiplications is reduced to $6(n/3)^2=2n^2/3$. However, compared to (1) for 2-decomposition, the number of additions needed for assembling the segment products to get $P(x)$ is increased a lot. For larger decomposition factors, the formulas in (1) and (3) can be applied in an iterative manner to further reduce the number of coefficient multiplications.

3. Karatsuba Polynomial Multiplication with Integrated Modular Reduction

Coefficient multipliers have larger silicon area than adders. Hence, the goal of the Karatsuba algorithm is to reduce the number of coefficient multiplications. More significant multiplication number reduction is achieved by using a larger decomposition factor. However, the number of additions needed to assemble the segment products increases fast with the decomposition factor as can be seen from (1) and (3). Since additions and subtractions have similar complexity, they are not differentiated in terms of complexity herein. Conventionally, the reduction by $x^n+1$ is carried out after the final product is computed. As shown in (2), the modular reduction by such a polynomial can be implemented as negating and shifting the coefficients for the terms whose powers are at least $x^n$. This paper proposes to carry out the modular reduction on the segment products in the Karatsuba multiplication before they are added up. This enables the sharing of many common terms in the segment product additions. As a result, the number of coefficient additions is substantially reduced without affecting the multiplication complexity.

In the discussion below, reference is made to "addition operations." Such operations can implement adding two values together or subtracting one value from another. In order to subtract a value, the negative of the value is added to the other value in the addition operation. As such, the "sum" of an addition operation can either represent the sum of two values or the difference between two values. Thus, generic references to addition operations below should be read as including the determination of either a sum of two values or the difference between two values. The determination of whether an addition operation produces a sum or a difference of two values can be determined by examining the context in which the addition operation is implemented in the discussion below.

Figure 1A:
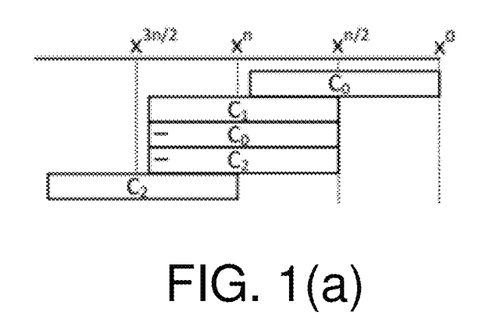
FIG. 1(a) is a graph showing the alignment of segment products that need to be added together in Karatsuba multiplication with 2-decomposition under the prior art.

In 2-decomposed Karatsuba multiplication, let $C_0(x)=A_0(x)B_0(x)$, $C_1(x)=(A_0(x)+A_1(x))(B_0(x)+B_1(x))$, and $C_2(x)=A_1(x)B_1(x)$. Each of these segment products has $n-1$ coefficients. In FIG. 1(a), each product is represented by a bar of length $n-1$. The bars are aligned to the powers of x that the segment products are multiplied to get $P(x)=P_0(x)+P_1(x)x^{n/2}+P_2(x)x^n$. For example, $C_0(x)=P_0(x)$ and $C_0(x)$ is also a part of $P_1(x)$, which is multiplied with $X^{n/2}$. Hence, there are two bars for $C_0$ starting from the columns of $x^0$ and $X^{n/2}$. The negative signs on the bars mean that the corresponding coefficients are to be subtracted. The coefficients in the same column need to be added/subtracted to derive each final coefficient of $P(x)$. Add 'l' and 'h' to the subscript of a segment product to denote its lower $n/2$ and higher $n/2-1$ coefficients, respectively. From FIG. 1(a), $C_{2,l}$-$C_{0,h}$ can be shared in the computations of the coefficients in the range of $x^{n/2}$ to $X^{n-1}$ and $x^n$ to $x^{3n/2-1}$. After all coefficients of $P(x)$ are derived, the highest $n-1$ coefficients are subtracted from the lowest $n-1$ coefficients to implement the modular reduction according to (2).

Figure 1B:
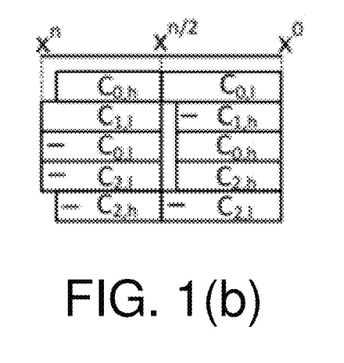
FIG. 1(b) is a graph showing the alignment of segment products that need to be added together in Karatsuba multiplication with 2-decomposition with integrated modular reduction by $x^n+1$.

To reduce the number of additions, embodiments carry out the modular reduction by $x^n+1$ on the segment products before they are added up. According to (2), any term $p_i x^i$ with $i \geq n$ becomes $-p_i x^{i-n}$ after the modular reduction. As a result, the segment products can be added up as shown in FIG. 1(b). Then the coefficients for $1, x, \ldots, x^{n/2-1}$ and those for $x^{n/2}, x^{n/2+1}, \ldots x^{n-1}$ in the final modular multiplication result can be computed as $(C_{0,h}-C_{2,l})-(C_{2,h}+C_{0,l})+C_{1,l}$ $(C_{0,h}-C_{2,l})+(C_{2,h}+C_{0,l})-C_{1,h}$.

Figure 2A:
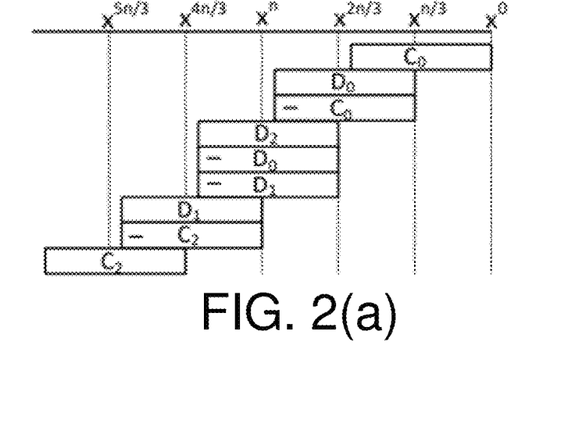
FIG. 2(a) is a graph showing the alignment of segment products that need to be added together in Karatsuba multiplication with 3-decomposition under the prior art
Figure 2B:
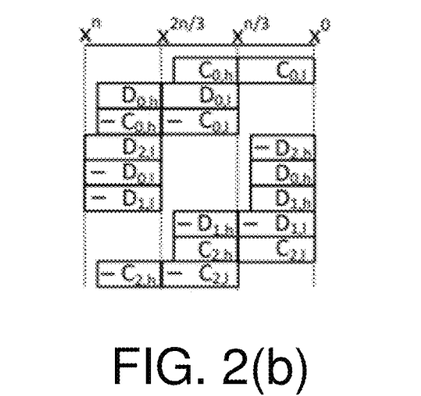
FIG. 2(b) is a graph showing the alignment of segment products that products need to be added together in Karatsuba multiplication with 3-decomposition with integrated modular reduction by $x^n+1$.

Two terms instead of one common term are shared in the above calculations and no further modular reduction is needed. In total, $2(n/2-1)+4n/2-1/3n-3$ coefficient additions are needed. The additional common term that is shared includes the first coefficients ($C_{0,l}$) and the last coefficients ($C_{2,h}$) of the product of the two polynomials $P(x)$, where the first coefficients are for powers of $x^0$ to $x^{n/2-1}$ in the product and the last coefficients are for powers of $X^{3n/2}$ to $x^{2n-2}$ in the product. As shown in FIG. 1(a), the Karatsuba multiplication followed by a modulo $x^n+1$ operation does not allow the first coefficients and the last coefficients of the product to be formed into a common term that can be reused during the multiplication and modulo $x^n+1$ operations. The present embodiments, on the other hand, allow these additional common terms to be formed thereby reducing the total number of operations that must be performed and significantly improving the operation of the device. For Karatsuba multiplication that decomposes operands into three segments, denote $A_0B_0$, $A_1B_1$, $A_2B_2$ by $C_0$, $C_1$, and $C_2$, respectively. Let $D_0$, $D_1$, and $D_2$ be $(A_0+A_1)(B_0+B_1)-C_1$, $(A_1+A_2)(B_1+B_2)-C_1$, and $(A_0+A_1+A_2)(B_0+B_1+B_2)$, respectively. From (3), these intermediate results should be added up according to FIG. 2(a) to derive $P(x)$. Three common terms, $C_{2,l}+D_{1,h}$, $D_{0,h}-D_{1,l}$, and $C_{0,h}+D_{0,l}$, can be shared to save $3(n/3-1)$ additions. Besides, another $n-1$ coefficient subtractions are required afterwards to modulo reduce $P(x)$ by $x^n+1$. On the other hand, by carrying out the modular reduction on the intermediate results first, more common terms become shareable among the segment product additions as shown in FIG. 2(b). The coefficients whose powers are in the ranges of $1$ to $x^{n/3-1}$, $x^{n/3}$ to $x^{2n/3-1}$, and $x^{2n/3}$ to $x^{n-1}$ in the final modular multiplication result can be computed as $(D_{0,h}-D_{1,l})-(D_{0,l}+C_{0,h}+C_{2,h})+D_{2,l}$ $(D_{0,l}+C_{0,h}+C_{2,h})-(D_{1,h}+C_{0,l}+C_{2,l})$ $(D_{0,h}-D_{1,l})+(D_{1,h}+C_{0,l}+C_{2,l})-D_{2,h}$ The shareable terms are enclosed in the parentheses above. Only $(n/3-1)+2(n/3-1)+2(n/3-1)+1+5n/3-1 = 10n/3-5$ coefficient additions are required. One of the common terms that is shared is $(D_{1,h} C_{0,l}+C_{2,l})$, which contains the first coefficients ($C_{0,l}$) of the product of the two polynomials $P(x)$, where the first coefficients are for powers of $x^0$ to $X^{n/3-1}$ in the product. Another of the common terms that is shared is $(D_{0,l}+C_{0,h}+C_{2,h})$, which contains the last coefficients ($C_{2,h}$) of the product of the two polynomials $P(x)$, where the last coefficients are for powers of $X^{5n/3}$ to $X^{2n-2}$ in the product. As shown in FIG. 2(a), the Karatsuba multiplication followed by a modulo $x^n+1$ operation does not allow the first coefficients and the last coefficients of the product to be formed into a common term that can be reused during the multiplication and modulo $x^n+1$ operations. The present embodiments, on the other hand, allow these additional common terms to be formed thereby reducing the total number of operations that must be performed and significantly improving the operation of the device.

The multiplication with a larger decomposition factor can be carried out by iteratively applying the formulas for small decomposition factors. For example, 4-decomposed polynomial multiplication can be implemented by applying the formulas in (1) for 2-decomposition in two layers. Let $A(x)=A_0(x)+A_1(x)x^{n/4}+A_2(x)x^{n/2}+A_3(x)x^{3n/4}$, where each $A_i(x)$ has $n/4$ coefficients. Define $A_0'(x)=A_0(x)+A_2(x)X^{n/2}$ and $A'_1(x)=A_1(x)+A_3(x)X^{n/2}$. Decompose $B(x)$ and define $B_0'$ and $B_1'(x)$ in a similar way. By applying the formulas in (1), $P(x)=(A_0'(x)+A_1'(x)x^{n/4})(B_0'(x)+B_1(x)x^{n/4})$ can be rewritten as $$P(x) = A'_0 B'_0 + ((A'_0 + A'_1)(B'_0 + B'_1) - A'_0 B'_0 - A'_1 B'_1)x^{n/4} \qquad (4)$$
$$+ A'_1 B'_1 x^{n/2}.$$

Then the formulas in (1) can be applied again to each of the product term in (4). For example, $A_0'(x)B_0'(x)=(A_0(x)+A_2(x)X^{n/2})(B_0(x)+B_2(x)X^{n/2})$ can be computed as $$A_0 B_0 + ((A_0+A_2)(B_0+B_2) - A_0 B_0 - A_2 B_2)x^{n/2} + A_2 B_2 x^n. \qquad (5)$$

Figure 3A:
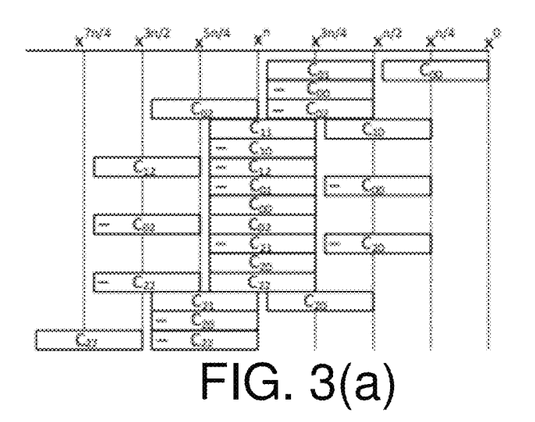
FIG. 3(a) is a graph showing the alignment of segment products that need to be added together in Karatsuba multiplication with 4-decomposition under the prior art

Using this 2-layer approach, the segment products need to be added up for $P(x)$ calculation as shown in FIG. 3(a). There are nine segment products in total. $C_{00}=A_0 B_0$, $C_{01}=(A_0+A_2)(B_0+B_2)$, and $C_{02}=A_2 B_2$ are used to compute $A_0' B_0'$ according to (5). $C_{20}=A_1 B_1$, $C_{21}=(A_1+A_3)(B_1+B_3)$, and $C_{22}=A_3 B_3$ contribute to the calculation of $A_1' B_1'$ in a similar way. $(A_0'+A_1')(B_0'+B_1')$ is derived by using $C_{10}=(A_0+A_1)(B_0+B_1)$, $C_{01}=(A_0+A_1+A_2+A_3)(B_0+B_1+B_2+B_3)$, and $C_{12}=(A_2+A_3)(B_2+B_3)$. The coefficients in the same column are added up to compute each coefficient of $P(x)$. Besides, $n-1$ coefficient additions are needed afterwards to carry out the modular reduction by $x^{n+1}$.

Figure 3B:
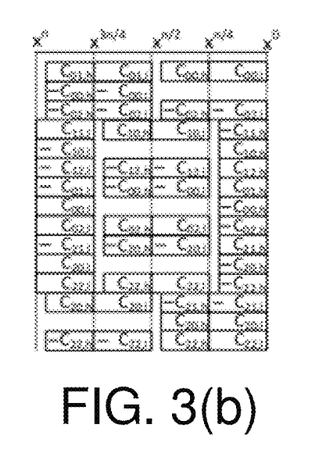
FIG. 3(b) is a graph showing the alignment of segment products that products need to be added together in Karatsuba multiplication with 4-decomposition with integrated modular reduction by $x^n+1$.
Figure 4:
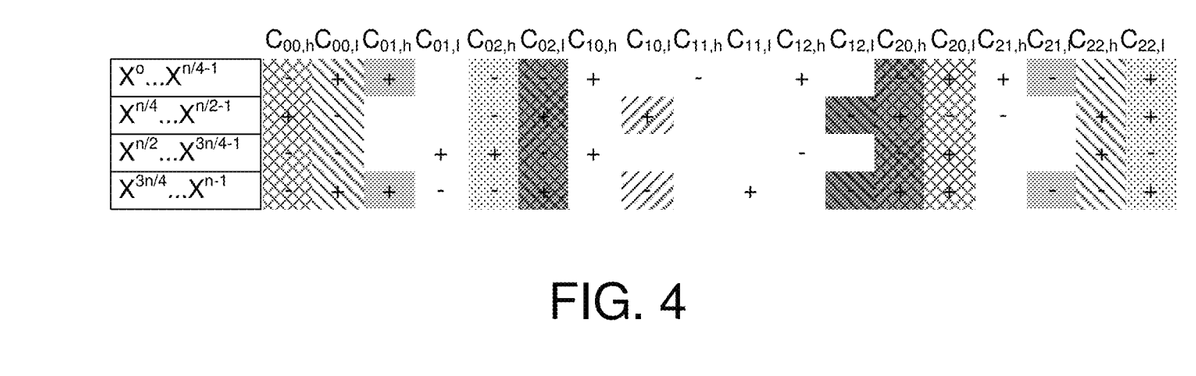
FIG. 4. is a table of common terms contributing to 4-decomposed Karatsuba multiplication with integrated polynomial modular reduction.

By applying the polynomial modular reduction on the segment products, the coefficients that need to be added up are aligned as shown in FIG. 3(b). The intermediate results shareable among the additions can be more easily identified by using FIG. 4. In this figure, each term involved in FIG. 3(b) is listed. If a term contributes to a sum, then a +/− sign is put into the corresponding entry. The common patterns among the rows correspond to the shareable intermediate results and they are shade-coded in FIG. 4. $X_0=C_{00,h}-C_{20,l}$, $X_1=C_{00,l}-C_{22,h}$, $X_2=C_{02,h}-C_{22,l}$, and $X_3=C_{02,l}+C_{20,h}$ can be shared among the computations for each of the four rows and $C_{01,h}-C_{22,l}$ is shareable between the first and last rows. Besides, $X_0-X_1$ can be further shared among the computations for rows 1, 2, and 4, and $(X_0-X_1)-C_{10,l}$ is common between rows 2 and 4. $X_2-X_3$ can be further shared among the calculations of the last three rows and $(X_2-X_3)+C_{12,l}$ are shareable between rows 2 and 4. Sharing these common terms saves $(4 \times 3+1+2+2+1+1)(n/4-1)+2+2+1+1=19(n/4-1)+6$ coefficient additions. A similar method can be applied to find the common terms shareable in the additions of the segment products in FIG. 3(a) and it was found that only 15(n/4−1)+4 coefficient additions can be saved.

$X_1$ includes the first coefficients ($C_{00,i}$) of the product of the two polynomials P(x), where the first coefficients are for powers of $x^0$ to $x^{n/4-1}$ in the product and includes the last coefficients ($C_{22,h}$) of the product of the two polynomials P(x), where the last coefficients are for powers of $x^{7n/4}$ to $X^{2n-2}$ in the product. As shown in FIG. 3(a), the Karatsuba multiplication followed by a modulo $x^n+1$ operation does not allow the first coefficients and the last coefficients of the product to be formed into a common term that can be reused during the multiplication and modulo $x^n+1$ operations. The present embodiments, on the other hand, allow these additional common terms to be formed thereby reducing the total number of operations that must be performed and significantly improving the operation of the device.

In the Karatsuba formulas, the same segment products are multiplied with different powers of x to compute the coefficients of the overall product. Hence, the same segment products appear at different columns in FIGS. 1(a), 2(a), and 3(a). Reducing the segment products by $x^n+1$ effectively relocates those with higher powers of x to the right-side of the plane. Since there are a limited number of segment products and most of them appear multiple times, it becomes more likely that the same terms need to be added up in different columns and hence more intermediate results can be shared. For Karatsuba multiplications with even larger decomposition factors, similar approaches can be applied to reduce the number of coefficient additions needed for assembling the segment products.

4. Complexity Analyses and Comparisons

The number of segment products is minimized in Karatsuba multiplication. However, the number of coefficient additions needed for assembling the segment products to derive the modular multiplication result can be reduced by integrating the $x^n+1$ reduction into the segment products as proposed in this paper. In this section, the number of coefficient additions needed for assembling the segment products in the proposed design is compared to that of the original Karatsuba multiplication for decomposition factors of 2, 3, and 4.

For 2-decomposition, considering that (n/2−1) additions are saved by sharing $C_{2,i}$-$C_{0,h}$, the number of coefficient additions needed for summing up the segment products in FIG. 1(a) and modulo reduction afterwards is 3(n/2−1)+3 (n/2−1)+2−(n/2−1)+n−1=7n/2−4. Similarly, by counting the number of segment products to add from FIG. 2(a) and taking into account shareable terms and the following modular reduction, the number of coefficient additions required for the original 3-decomposed design is 2(n/3−1)+4(n/3−)+1+4(n/3−1)+2+2(n/3−1)+1−3(n/3−1)+(n−1)=4n−6. On the other hand, the proposed approach only needs 3n−3 and 10/3n−5 additions for 2 and 3-decomposed designs, respectively, as analyzed in the previous section. The numbers of additions needed to sum up the segment products following FIG. 3(a) and FIG. 3(b) in a straightforward manner are 42(n/4−1)+18 and 46(n/4−1)+21, respectively. Adopting substructure sharing, the original and the proposed designs require 42(n/4−1)+18−(15(n/4−1)+4)+(n−1)=31n/4−14 and (46n/4−1)+21−(19(n/4−1)+6)=27n/4−12 coefficient additions, respectively. These numbers are listed in Table 1. Ignoring the constant components in the formulas, the proposed design can achieve around 14%, 17%, and 13% reductions for decomposition factors 2, 3, and 4, respectively.

Thus, the number of addition operations (both adding and subtracting values) for polynomials decomposed into 2 segments is on the order of 3n operations; the number of addition operations (both adding and subtracting values) for polynomials decomposed into 3 segments is on the order of 10n/3 operations; and the number of addition operations (both adding and subtracting values) for polynomials decomposed into 4 segments is on the order of 27n/4 operations.

TABLE 1

Number of additions needed for assembling segment products in modular multiplication using Karatsuba formula

|  | 2-decomp | 3-decomp | 4-decomp |
| --- | --- | --- | --- |
| mod. + mod. | 7n/2 − 4 | 4n − 6 | 31n/4 − 14 |
| proposed | 3n − 3 | 10n/3 − 5 | 27n/4 − 12 |

Figure 5:
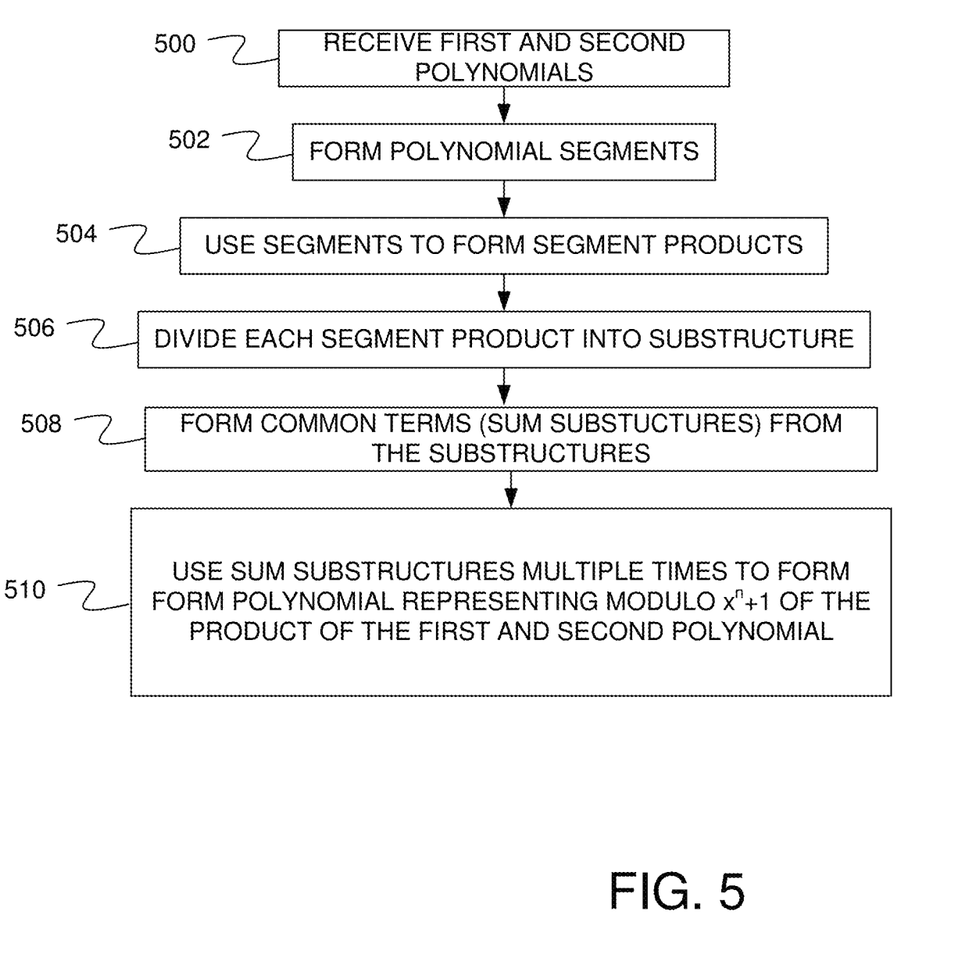
FIG. 5 is a flow diagram of a method determining a product of two polynomials in accordance with one embodiment.
Figure 6:
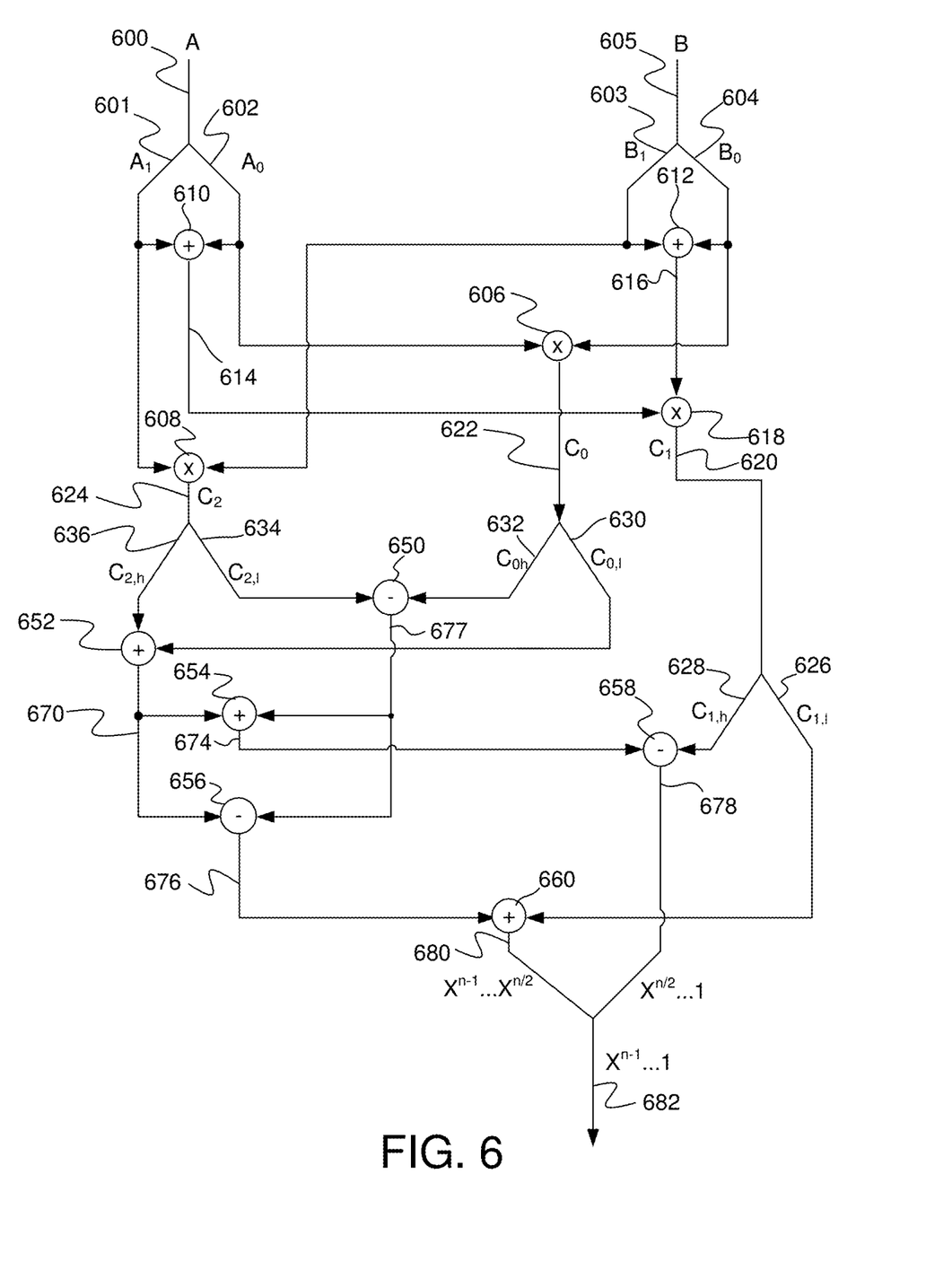
FIG. 6 is a block diagram of a dedicated circuit used to determine the product of two polynomials in accordance with one embodiment.

FIG. 5 provides a flow diagram of a method of performing a modulo $x^n+1$ polynomial multiplication of two polynomials of order n−1. In accordance with one embodiment, this method is performed as part of a cryptographic operation. FIG. 6 provides a block diagram of a specialized hardware device consisting of multiplication and addition units dedicated to performing the method of FIG. 5 by dividing the input polynomials into two segments.

In step 500 of FIG. 5, first and second polynomials such as polynomials A(x) and B(x) of FIG. 6 are received at the dedicated hardware. In accordance with one embodiment, each polynomial is of an order of n−1 and receiving the polynomials comprises receiving the coefficients for the polynomials on a group of electrical conductors 600 for polynomial A(x) and a group of electrical conductors 605 for polynomial B(x). At step 502, polynomial segments are formed from the received polynomials. In the embodiments described above, 2, 3, or 4 segments are formed depending on the particular embodiment. If the number of segments is d, each segment is of order (n/d)−1. In the example embodiment of FIG. 6, d=2 so two segments are formed for polynomial A(x) by separating the group of electrical conductors 600 carrying the coefficients for polynomial A(x) into segment conductor group 601 carrying the coefficients for segment $A_1$ and segment conductor group 602 carrying the coefficients for segment $A_0$. Two segments are formed for polynomial B(x) by separating the group of electrical conductors 605 carrying the coefficients for polynomial B(x) into segment conductor group 603 carrying the coefficients for segment $B_1$ and segment conductor group 604 carrying the coefficients for segment $B_0$.

At step 504, the segments are used to compute segment products, such as $C_0$, $C_1$, and $C_2$ in FIG. 6. Segment product $C_0$ is formed in FIG. 6 by applying the electrical conductors in segment conductor group 602 for segment $A_0$ and the electrical conductors in segment conductor group 604 for segment $B_0$ to a dedicated multiplication circuit 606 that multiplies each coefficient carried by segment conductor group 602 by every coefficient carried by segment conductor group 604. The output of dedicated multiplication circuit 606 is conductor group 622, which carries n−1 coefficients. Similarly, segment product $C_2$ is formed by applying the electrical conductors of segment conductor group 601 representing the coefficients of segment $A_1$ and the electrical conductors of segment conductor group 603 representing the coefficients of segment $B_1$ to a dedicated multiplication circuit 608 that multiplies each coefficient carried by segment conductor group 601 by every coefficient carried by segment conductor group 603. The output of dedicated multiplication circuit 608 is conductor group 624, which carries n−1 coefficients. Segment product $C_1$ is formed by first applying the electrical conductors of segment conductor group 601 and the electrical conductors of segment conductor group 602 to a dedicated addition circuit 610 that adds each coefficient carried by the electrical conductors of segment conductor group 601 by a corresponding coefficient carried by segment conductor group 603. In particular, for all values of α from 0 to n/2−1, the coefficient for $x^\alpha$ found in segment $A_0$ is added to the coefficient of $x^\alpha$ found in segment $A_1$. Similarly, the electrical conductors of conductor group 603 and the electrical conductors of conductor group 604 are applied to a dedicated addition circuit 612 that adds each coefficient of segment $B_1$ to a corresponding coefficient of segment $B_0$. Conductor groups 614 and 616, which are output by addition circuit 610 and 612, respectively, each carry the n/2 sums formed by their respective addition circuits. Conductor groups 614 and 616 are applied to a dedicated multiplication circuit 618 that multiples each sum carried by conductor group 614 by every sum carried by conductor group 616. The output of dedicated multiplication circuit 618 is conductor group 622, which carries n−1 coefficients.

Steps 502 and 504 implement portions of the Karatsuba scheme for polynomial multiplication.

At step 506, each of segment products $C_0$, $C_1$ and $C_2$ are divided into substructures by dividing conductor groups 620, 622 and 624 into conductor subgroups 626, 628, 630, 632, 634 and 636 at step 506. Conductor subgroup 626 carries the $C_{1,l}$ coefficients and conductor subgroup 628 carries the $C_{1,h}$ coefficients of segment product $C_1$. Conductor subgroup 630 carries the $C_{0,l}$ coefficient and conductor subgroup 632 carries the $C_{0,h}$ coefficients of product segment $C_0$. Conductor subgroup 634 carries the $C_{2,l}$ coefficients and conductor subgroup 636 carries the $C_{2,h}$ coefficients of segment product $C_2$.

At step 508, common terms, also referred to as sum substructures, are formed from the substructures of the segment products. Each sum substructure is formed by adding each coefficient of a segment substructure to a corresponding coefficient of another segment substructure. At least one of the sum substructures is formed using a segment substructure that contains the first n/d coefficients (for powers of $x^0$ to $x^{n/d-1}$) of the product of A(x) and B(x) and at least one of the sum substructures is formed using a segment substructure that contains the last (n/d)−1 coefficients (for powers $X^{(2d-1)n/d}$ to $x^{2n-2}$) of the product of A(x) and B(x).

In FIG. 6, step 508 is implemented using dedicated addition and subtraction circuits 650 and 652. Specifically, conductor subgroups 632 and 634 are input to dedicated subtraction circuit 650, which subtracts each coefficient of $C_{2,l}$ from a corresponding coefficient of $C_{0,h}$ and provides the resulting differences on difference electrical conductors 677, which represent a sub substructure. Conductor subgroups 626 and 630 are input to dedicated addition circuit 652, which adds each coefficient of $C_{2,h}$ to a corresponding efficient of $C_{0,l}$ and provides the resulting sums on sum electrical conductors 670, which represent a second sum substructure.

At step 510, the sum substructures are used multiple times to determine coefficients of a polynomial representing the modulo $x^{n+1}$ of the product of A(x) and B(x). In FIG. 6, this involves applying the sum substructure on different electrical conductors 677 and the sum substructure on sum electrical conductors 670 to both a dedicated addition circuit 654 and a dedicated subtraction circuit 656. Dedicated addition circuit 654 adds each coefficient carried by sum electrical conductors 670 with a corresponding coefficient carried by difference electrical conductors 677. Subtraction circuit 656 determines a difference between each coefficient carried by difference electrical conductors 672 a corresponding coefficient carried by sum electrical conductors 670. The sums output by addition circuit 654 are carried by electrical conductors 674 and the differences output by subtraction circuit 656 are carried on electrical conductors 676. Electrical conductors 674 are input to subtraction circuit 658 together with conductor subgroup 628. Subtraction circuit 658 determines a difference between each sum carried by electrical conductors 674 and a corresponding coefficient carried by conductor subgroup 628 for $C_{1,h}$. The differences produced by subtraction circuit 658 are carried by electrical conductors 678 and represent the coefficients for the lower n/2 powers of x. Electrical conductors 676 are input to addition circuit 660 together with conductor subgroup 626. Addition circuit 660 adds each coefficient carried by electrical conductors to a corresponding coefficient carried by conductor subgroup 626 for $C_{1,l}$. The sums produced by addition circuit 660 are carried by electrical conductors 680 and represent coefficients for powers of x between n/2 and n−1. Electrical conductors 680 and 678 are combined into a larger conductor group 682 representing the result consisting of n coefficients.

Dedicated subtraction circuit 650 and dedicate addition circuit 652 form a respective difference and sum that are used multiple times. In particular, the outputs of dedicated difference circuit 650 and dedicated addition circuit 652 are applied to both dedicated addition circuit 654 and dedicated difference circuit 656 and thus are determined once but are used twice. In addition the output of addition circuit 652 is used as part of implementing the modulo $x^n+1$ operation. As shown in FIG. 1B, the modulo $x^n+1$ operation involves subtracting $C_{2,h}$ to form the higher coefficients of the result and adding $C_{0,l}$ to form the lower coefficients of the result. In FIG. 6, $C_{0,l}$ and $C_{2,h}$ are provided as input to addition circuit 652 and the resulting sum of circuit 652 is used to perform the modulo $x^n+1$ operation through its application to dedicated addition circuit 654 and dedicated subtraction circuit 656. Thus, the first coefficients of the product and the last coefficients of the product are used to form a difference and sum that are each used multiple times. This reduces the number of additions that must be performed and thereby improves the device.

Although the embodiment of FIG. 6 shows each addition being performed by a separate dedicated adder, in other embodiments a single adder is provided and is time-multiplexed to perform all of the addition operations described above.

Although an embodiment is described above that uses dedicated hardware to optimize performance, the embodiments described above may also be applied to a software implementation on a computer. In such embodiments, a processor executes instructions stored in a memory to implement the steps described in FIG. 5. The reduction in the number of additions performed to determine the modulo $x^{n+1}$ of the product of two polynomials that is provided by the various embodiments, improves the operation of the computer by allowing the computer to obtain the result faster than it could without the embodiments described above. As such, the embodiments represent a technical solution to the technical problem of slow running computers.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A device-implemented method comprising:
   receiving a first polynomial and a second polynomial, both of order n−1 as part of a cryptographic operation; and
   reducing a number of additions needed to be performed to execute the cryptographic operation by performing steps comprising:
      forming d polynomial segments from both the first polynomial and the second polynomial such that each polynomial segment is of order (n/d)−1;
      using the d polynomial segments of the first polynomial and the d polynomial segments of the second polynomial to form segment products;
      dividing each segment product into a first polynomial substructure of order n/d and a second polynomial substructure of order (n/d)−1;
      summing a first polynomial substructure containing the first n/d coefficients of a product of the first polynomial and the second polynomial with a second polynomial substructure to form a sum substructure, and
      using the sum substructure multiple times to determine coefficients of a polynomial representing modulo $x^n+1$ of the product of the first polynomial and the second polynomial.

2. The device-implemented method of claim 1 wherein the coefficients of the polynomial representing the modulo $x^n+1$ of the product of the first polynomial and the second polynomial are determined by performing a number of addition operations after forming the segment products wherein the number of addition operations consists of:
   at most an order of 3n addition operations for d equal 2;
   at most an order of 10n/3 addition operations for d equal 3; or
   at most an order of 27n/4 addition operations for d equal 4.

3. The device-implemented method of claim 2 wherein the number of addition operations is at most an order of 3n addition operations.

4. The device-implemented method of claim 3 wherein the number of addition operations is at most 3n-3 addition operations.

5. The device-implemented method of claim 2 wherein the number of addition operations is at most an order of 10n/3 addition operations.

6. The method of claim 5 wherein the number of addition operations is at most (10n/3)−5 addition operations.

7. The method of claim 2 wherein the number of addition operations is at most an order of 27n/4 addition operations.

8. The method of claim 7 wherein the number of addition operations is at most (27n/4)−12 addition operations.

9. A device-implemented method comprising:
   receiving a first polynomial and a second polynomial, both of order n−1 as part of executing a cryptographic operation;
   using a Karatsuba scheme on the first polynomial and second polynomial to form segment products;
   dividing each segment product into a first polynomial substructure and a second polynomial substructure;
   summing a second polynomial substructure, containing the last (n/d)−1 coefficients of a product of the first polynomial and the second polynomial, with a first polynomial substructure to form a sum substructure; and
   reducing a number of additions that are performed to execute the cryptographic operation using the sum substructure multiple times to determine coefficients of a polynomial representing modulo $x^n+1$ of the product of the first polynomial and the second polynomial.

10. The device-implemented method of claim 9 wherein determining the coefficients of the polynomial representing the modulo $x^n+1$ of the product of the first polynomial and the second polynomial comprises performing a number of addition operations after forming the segment products wherein the number of addition operations consists of:
    at most one of an order of 3n addition operations;
    at most an order of 10n/3 addition operations; or
    at most an order of 27n/4 addition operations.

11. The device-implemented method of claim 10 wherein the number of addition operations is at most an order of 3n addition operations.

12. The device-implemented method of claim 11 wherein the number of addition operations is at most 3n−3 addition operations.

13. The device-implemented method of claim 10 wherein the number of addition operations is at most an order of 10n/3 addition operations.

14. The device-implemented method of claim 13 wherein the number of addition operations is at most (10n/3)−5 addition operations.

15. The device-implemented method of claim 10 wherein the number of addition operations is at most an order of 27n/4 addition operations.

16. The device-implemented method of claim 15 wherein the number of addition operations is at most (27n/4)−12 addition operations.

17. A method comprising:
    performing a cryptographic operation based on a modulo $x^n+1$ of a product of two polynomials each of order n−1 through steps comprising:
    using a Karatsuba scheme of forming a product of the two polynomials to form segment products;
    dividing each segment product into polynomial substructures;
    forming a sum substructure using a polynomial substructure containing coefficients of a polynomial representing the product of the two polynomials;
    reducing the number of additions performed while performing the cryptographic operation by using the sum substructure multiple times to determine coefficients for a polynomial representing a modulo $x^n+1$ of the product of the two polynomials.

18. The method of claim 17 wherein determining the coefficients for the polynomial representing a modulo $x^n+1$ of the product of the two polynomials comprises performing a number of addition operations using the polynomial substructures wherein the number of addition operations consists of at most one of an order of 3n addition operations; an order of 10n/3 addition operations; and an order of 27n/4 addition operations.

19. The method of claim 18 wherein the number of addition operations is at most 3n−3 addition operations.

20. The method of claim 17 wherein the polynomial substructure containing coefficients of the polynomial representing the product of the two polynomials contains a coefficient at an end of the polynomial representing the product.

\* \* \* \* \*